(12) United States Patent
Viswanathan

(10) Patent No.: US 11,151,391 B2
(45) Date of Patent: Oct. 19, 2021

(54) METHOD AND APPARATUS FOR CREATING A VISUAL MAP WITHOUT DYNAMIC CONTENT

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 76 days.

(21) Appl. No.: 16/214,409

(22) Filed: Dec. 10, 2018

(65) Prior Publication Data

US 2020/0184231 A1    Jun. 11, 2020

(51) Int. Cl.
| | |
|---|---|
| *G06T 7/00* | (2017.01) |
| *G06K 9/00* | (2006.01) |
| *G06T 7/174* | (2017.01) |
| *G06T 7/70* | (2017.01) |
| *G01C 21/36* | (2006.01) |

(Continued)

(52) U.S. Cl.
CPC ..... *G06K 9/00791* (2013.01); *G01C 21/3647* (2013.01); *G05D 1/0246* (2013.01); *G06K 9/6231* (2013.01); *G06K 9/6261* (2013.01); *G06K 9/6267* (2013.01); *G06K 9/726* (2013.01); *G06T 7/174* (2017.01); *G06T 7/70* (2017.01); *G05D 2201/0213* (2013.01); *G06T 2207/20084* (2013.01); *G06T 2207/30252* (2013.01)

(58) Field of Classification Search
CPC .......... G06K 9/00791; G06K 9/00798; G06K 9/6267; G06K 9/00718; G06T 2207/20084; G06T 7/215
See application file for complete search history.

(56) References Cited

U.S. PATENT DOCUMENTS 9,842,282 B2    12/2017 Liu et al.
9,940,729 B1 *    4/2018 Kwant ..................... G06T 7/73
(Continued)

OTHER PUBLICATIONS

Becattini, F. et al., *Semantic Road Layout Understanding by Generative Adversarial Inpainting*, [online] [retrieved Feb. 4, 2019]. Retrieved from the Internet: <URL: https://arxiv.org/pdf/1805.11746.pdf>. (dated May 29, 2018) 6 pages.
(Continued)

*Primary Examiner* — Li Liu
(74) *Attorney, Agent, or Firm* — Alston & Bird LLP

(57) ABSTRACT

Methods described herein relate to creating a visual map of an environment free of scene clutter. Methods may include: receiving sensor data from at least one image sensor, where the sensor data is representative of a plurality of images, each image representative of a scene at a scene location; processing each image using semantic scene segmentation to identify segments of the image of the scene; classifying the segments of each of the images into one of static elements or dynamic elements; generating a decluttered image of the scene, where the decluttered image includes only elements classified as static elements; providing for storage of the decluttered image of the scene in a database; and identifying a location of a device as the scene location in response to sensor data from the device corresponding to the decluttered image of the scene.

20 Claims, 6 Drawing Sheets

(51) Int. Cl.
*G05D 1/02* (2020.01)
*G06K 9/62* (2006.01)
*G06K 9/72* (2006.01)

(56) References Cited

U.S. PATENT DOCUMENTS

| | | | |
|---|---|---|---|
| 9,971,470 B2 | 5/2018 | Cooper et al. | |
| 10,311,312 B2* | 6/2019 | Yu | G06K 9/00805 |
| 2018/0075593 A1 | 3/2018 | Wang et al. | |
| 2018/0336421 A1 | 11/2018 | Huang et al. | |
| 2019/0147254 A1* | 5/2019 | Bai | G05D 1/0231 382/104 |
| 2019/0286153 A1* | 9/2019 | Rankawat | G06T 7/11 |
| 2019/0286915 A1* | 9/2019 | Patil | G06T 7/55 |
| 2019/0355103 A1* | 11/2019 | Baek | G06K 9/6256 |
| 2020/0033880 A1* | 1/2020 | Kehl | G06K 9/00798 |
| 2020/0073969 A1* | 3/2020 | Kursar | G06N 20/00 |

OTHER PUBLICATIONS

Bescos, B. et al., *Removing Dynamic Objects From 3D Maps Using Geometry and Learning* [online] [retrieved Feb. 1, 2019]. Retrieved from Internet: <URL: https://webdiis.unizar.es/~imfacil/docs/bbescos2017lfslm-draft.pdf>. (dated 2018) 5 pages.

Sultana, M. et al., *Unsupervised Deep Context Prediction For Background Estimation and Foreground Segmentation* [online] [retrieved Feb. 1, 2019]. Retrieved from the Internet: <URL: https://arxiv.org/pdf/1805.07903.pdf> (dated May 21, 2018) 17 pages.

Zheng et al., *Background Subtraction Algorithm With Bayesian Generative Adversarial Networks*, Zidonghua Xuebao/Acta Automatics Sinica 44(5) [online] [retrieved Jul. 20, 2018]. <URL: https://www.researchgate.net/publication/325391932_Background_Subtraction_Algorithm_with_Bayesian_Generative_Adversarial_Networks>. (dated May 2018) 1page.

Extended European Search Report for Application No. 19214398.0 dated Apr. 6, 2020, 7 pages.

Berlincioni, L. et al., *Road Layout Understanding By Generative Adversarial Inpainting*, Cornell University Library (May 30, 2018), 18 pages.

Garcia-Garcia, A. et al., *A Survey on Deep Learning Techniques For Image and Video Semantic Segmentation*, Applied Soft Computing 70 (2018) 41-65.

\* cited by examiner

METHOD AND APPARATUS FOR CREATING A VISUAL MAP WITHOUT DYNAMIC CONTENT

TECHNOLOGICAL FIELD

Example embodiments of the present invention relate generally to creating a visual map of an environment free of scene clutter, and more particularly, to a process of creating a visual map of an environment whereby dynamic elements are removed and static elements remain for an undistorted geometry of the scene.

BACKGROUND

Road geometry modelling is very useful for map creation and identification of objects of interest in environments, such as road signs along a road segment. Such object identification may facilitate autonomous vehicle navigation along a prescribed path and/or visual localization of a vehicle traveling along a road segment based on scene or environment identification. Traditional methods for modelling of road geometry and environment or feature detection are resource intensive, often requiring significant amounts of human measurement and calculation. Such methods are thus time consuming and costly. Exacerbating this issue is the fact that many modern day applications require the analysis of large amounts of data, and therefore are not practical without quicker or less costly techniques.

Vision based mapping relies upon the identification of a location based on recognition of the environment. Vision based mapping includes a map represented as a collection of geo-referenced images that are amenable to visual place recognition. In the case of environments that do not have satellite-based navigation availability, or where accuracy from satellite-based navigation methods may be low, a localization technique is needed to position an object, such as a vehicle, within the environment. However, due to elements of an environment changing over time, particularly those elements that are temporary, visual identification of an environment may be challenging.

BRIEF SUMMARY

Accordingly, a method, apparatus, and computer program product are provided for creating a visual map of an environment free of scene clutter, and more particularly, to a process of creating a visual map of an environment whereby dynamic elements are removed and static elements remain for an undistorted geometry of the scene. Embodiments described herein may provide an apparatus including at least one processor and at least one non-transitory memory including computer program code instructions. The computer program code instructions are configured to, when executed, cause the apparatus to at least: receive sensor data from at least one image sensor, where the sensor data is representative of a plurality of images, each image representative of a scene at a scene location; process each image using semantic scene segmentation to identify segments of the image of the scene; classify the segments of each of the images of the scene into one of static elements or dynamic elements; generate a decluttered image of the scene, where the decluttered image includes only elements classified as static elements; provide for storage of the decluttered image of the scene in a database; and identify a location of a device as the scene location in response to sensor data from the device corresponding to the decluttered image of the scene.

According to some embodiments, causing the apparatus to process each image using semantic scene segmentation to identify segments of the image of the scene comprises causing the apparatus to process each image using a neural network that performs semantic scene segmentation to identify segments of the image of the scene. Causing the apparatus to generate a decluttered image of the scene may include causing the apparatus to: process segmented images using a general adversarial network to hallucinate image contents of the scene; and constrain a geometry of the decluttered image of the scene based on the static elements of the scene. Causing the apparatus to identify a location of a device as the scene location may include causing the apparatus to: receive sensor data from the device representative of a scene; correlate the received sensor data with the stored decluttered image of the scene; and identify a location of the device as the scene location.

The device of some embodiments may be an autonomous vehicle. In response to identifying the location of the device as the scene location, the apparatus may be caused to provide for autonomous control of the autonomous vehicle based on the identified location of the autonomous vehicle. The device of some embodiments may include a vehicle, where in response to identifying the location of the device as the scene location, the apparatus may be caused to provide for navigational assistance to the vehicle based on the identified location of the vehicle. Causing the apparatus to classify the segments of each of the images of the scene into one of static elements or dynamic elements may include causing the apparatus to analyze distinctions between images of the scene and classifying elements that change between images as dynamic elements.

Embodiments described herein may provide a computer program product including at least one non-transitory computer-readable storage medium having computer-executable program code instructions stored therein. The computer-executable program code instructions may include program code instructions to: receive sensor data from at least one image sensor, where the sensor data is representative of a plurality of images, each image representative of a scene at a scene location; process each image using semantic scene segmentation to identify segments of the image of the scene; classify the segments of each of the images of the scene into one of static elements or dynamic elements; generate a decluttered image of the scene, where the decluttered image includes only elements classified as static elements; provide for storage of the decluttered image of the scene in a database; and identify a location of a device as the scene location in response to sensor data from the device corresponding to the decluttered image of the scene.

According to some embodiments, the program code instructions to process each image using semantic scene segmentation to identify segments of the image of the scene may include program code instructions to process each image using a neural network that performs semantic scene segmentation to identify segments of the image of the scene. The program code instructions to generate a decluttered image of the scene may include program code instructions to: process segmented images using a general adversarial network to hallucinate image contents of the scene; and constrain a geometry of the decluttered image of the scene based on the static elements of the scene. The program code instructions to identify a location of a device as the scene location may include program code instructions to: receive sensor data from the device representative of a scene;

correlate the received sensor data with the stored decluttered image of the scene; and identify a location of the device as the scene location.

The device of some embodiments may include an autonomous vehicle, where in response to identifying the location of the device as the scene location, autonomous control of the autonomous vehicle may be provided based on the identified location of the vehicle. The device may include a vehicle, where in response to identifying the location of the device as the scene location, navigational assistance may be provided to the vehicle based on the identified location of the vehicle. The program code instructions to classify the segments of each of the images of the scene into one of static elements or dynamic elements may include program code instructions to analyze distinctions between images of the scene and classify elements that change between images as dynamic elements.

Embodiments described herein may provide a method including: receiving sensor data from at least one image sensor, where the sensor data is representative of a plurality of images, each image representative of a scene at a scene location; processing each image using semantic scene segmentation to identify segments of the image of the scene; classifying the segments of each of the images of the scene into one of static elements or dynamic elements; generating a decluttered image of the scene, where the decluttered image includes only elements classified as static elements; providing for storage of the decluttered image of the scene in a database; and identifying a location of a device as the scene location in response to sensor data from the device corresponding to the decluttered image of the scene.

According to some embodiments, processing each image using semantic scene segmentation to identify segments of the image of the scene may include processing each image using a neural network that performs semantic scene segmentation to identify segments of the image of the scene. Generating a decluttered image of the scene may include: processing segmented images using a general adversarial network to hallucinate image contents of the scene; and constraining a geometry of the decluttered image of the scene based on the static elements of the scene.

Identifying a location of a device as the scene location may include: receiving sensor data from the device representative of a scene; correlating the received sensor data with the stored decluttered image of the scene; and identifying a location of the device as the scene location. The device may include an autonomous vehicle, where in response to identifying the location of the device as the scene location, methods may include providing for autonomous control of the vehicle based on the identified location of the autonomous vehicle. The device may include a vehicle, where in response to identifying the location of the device as the scene location, methods may include providing for navigational assistance to the vehicle based on the identified location of the vehicle.

Embodiments described herein may provide an apparatus including: means for receiving sensor data from at least one image sensor, where the sensor data is representative of a plurality of images, each image representative of a scene at a scene location; means for processing each image using semantic scene segmentation to identify segments of the image of the scene; means for classifying the segments of each of the images of the scene into one of static elements or dynamic elements; means for generating a decluttered image of the scene, where the decluttered image includes only elements classified as static elements; means for providing for storage of the decluttered image of the scene in a database; and means for identifying a location of a device as the scene location in response to sensor data from the device corresponding to the decluttered image of the scene.

According to some embodiments, the means for processing each image using semantic scene segmentation to identify segments of the image of the scene may include means for processing each image using a neural network that performs semantic scene segmentation to identify segments of the image of the scene. The means for generating a decluttered image of the scene may include: means for processing segmented images using a general adversarial network to hallucinate image contents of the scene; and means for constraining a geometry of the decluttered image of the scene based on the static elements of the scene.

The means for identifying a location of a device as the scene location may include: means for receiving sensor data from the device representative of a scene; means for correlating the received sensor data with the stored decluttered image of the scene; and means for identifying a location of the device as the scene location. The device may include an autonomous vehicle, where in response to identifying the location of the device as the scene location, the apparatus may include means for providing for autonomous control of the vehicle based on the identified location of the autonomous vehicle. The device may include a vehicle, where in response to identifying the location of the device as the scene location, the apparatus may include means for providing for navigational assistance to the vehicle based on the identified location of the vehicle.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
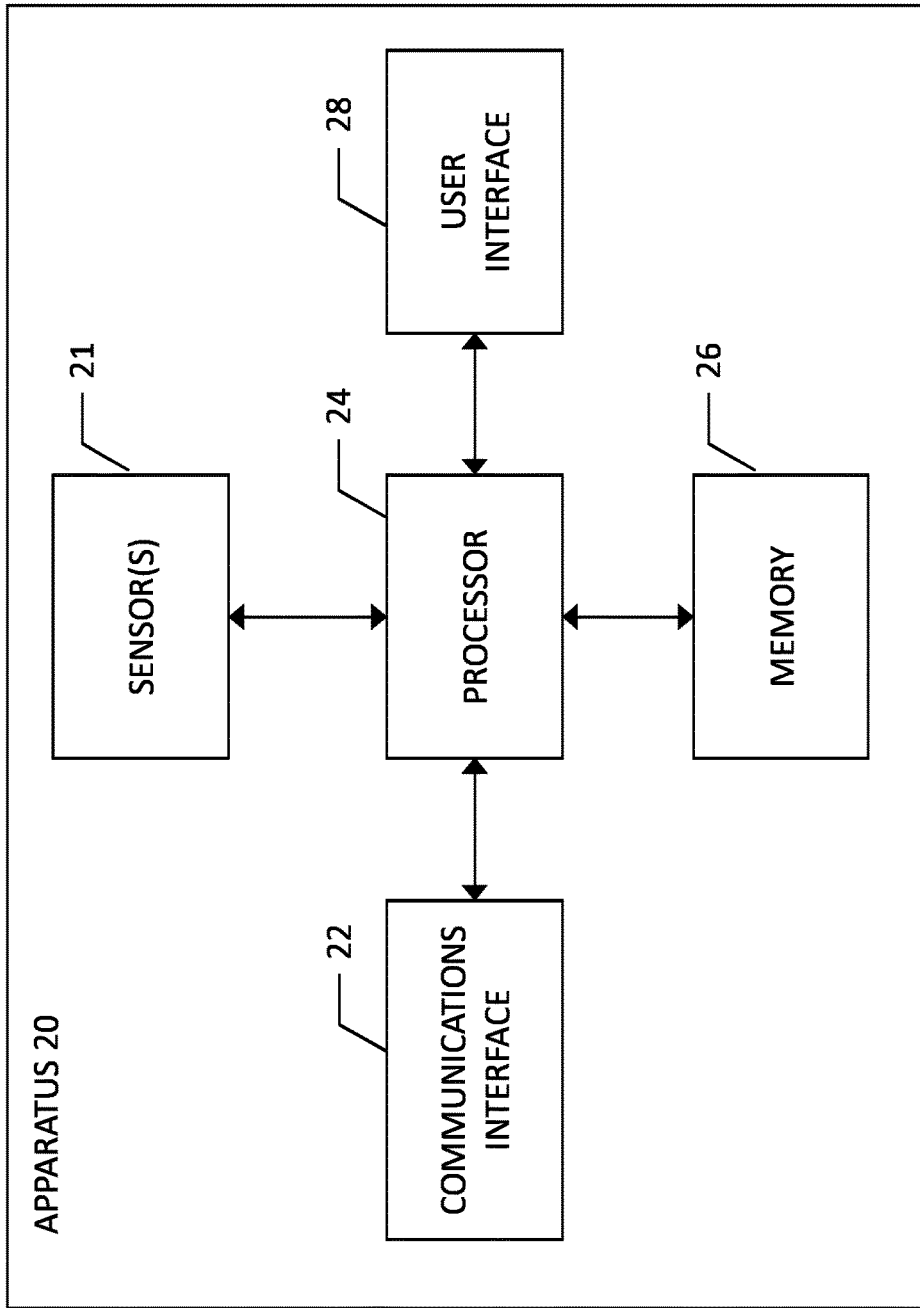
Figure 2:
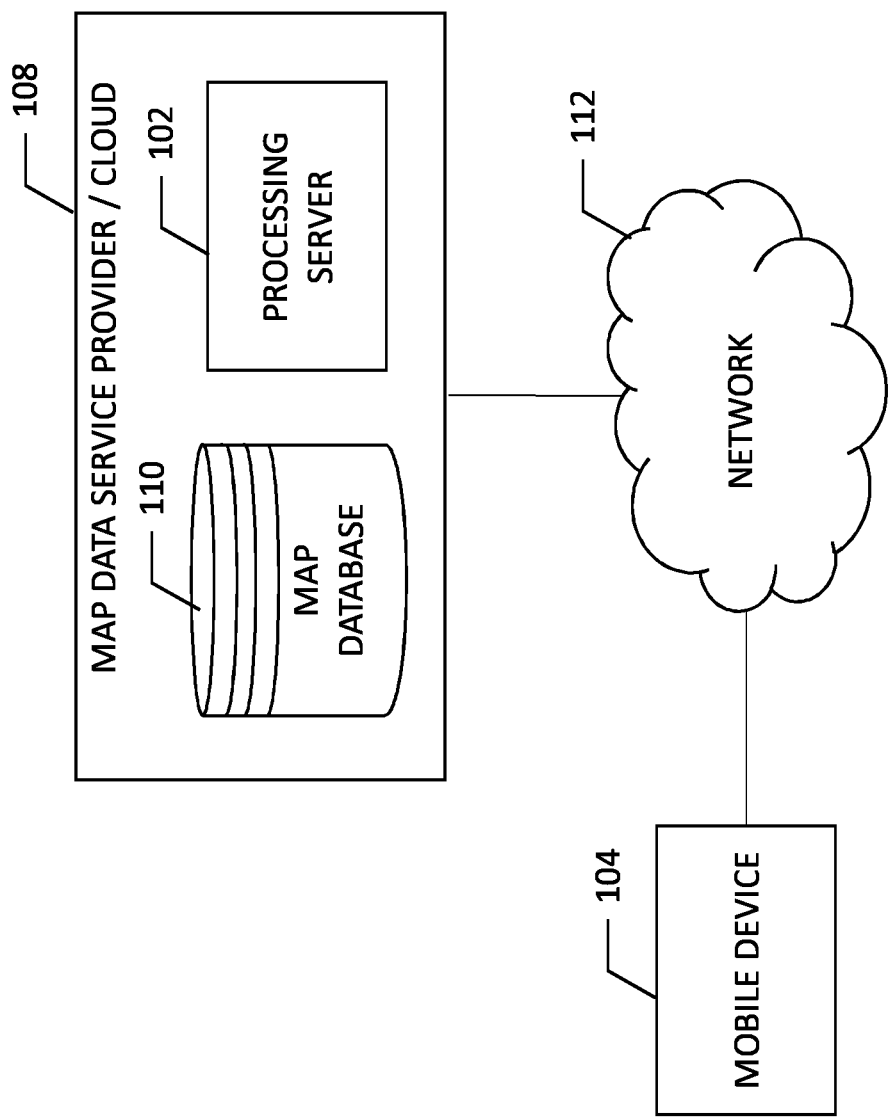
Figure 3:
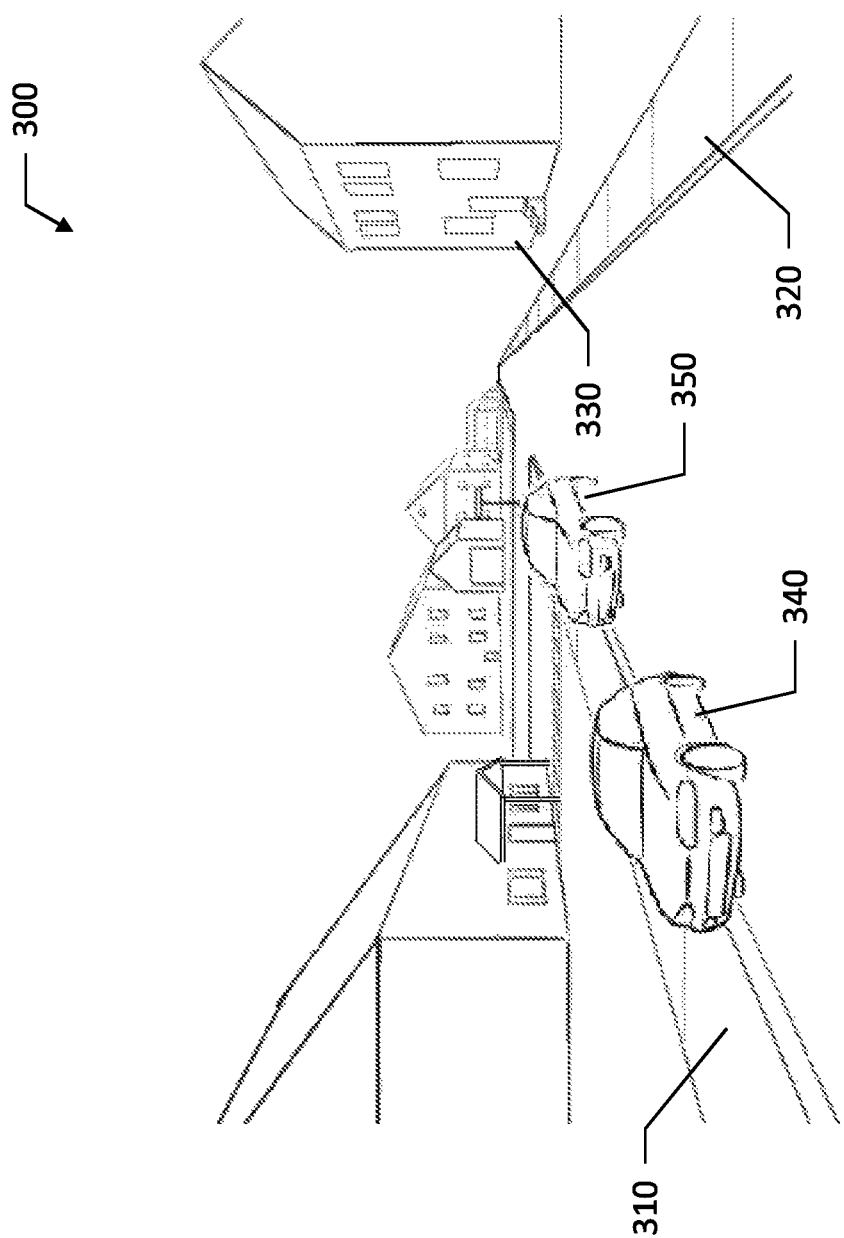
Figure 4:
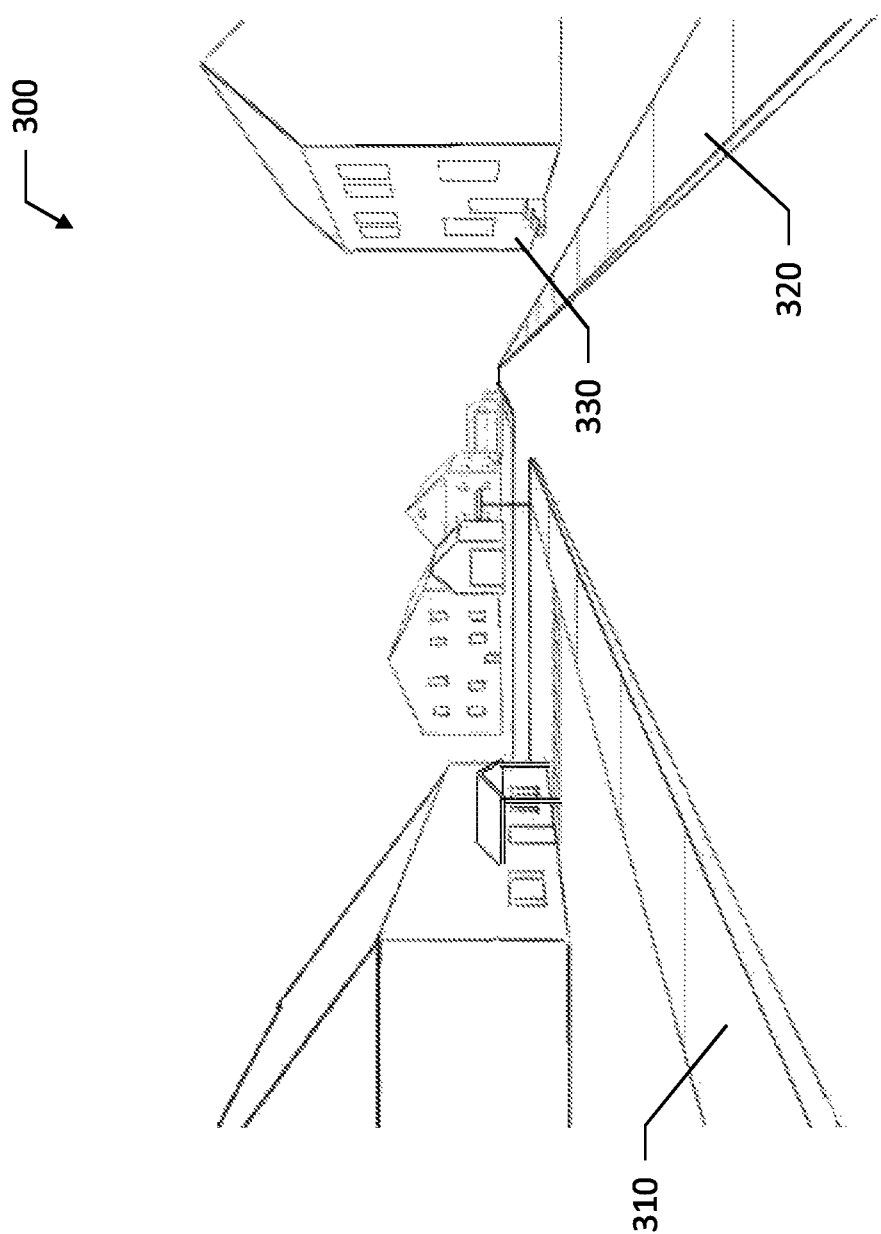
Figure 5:
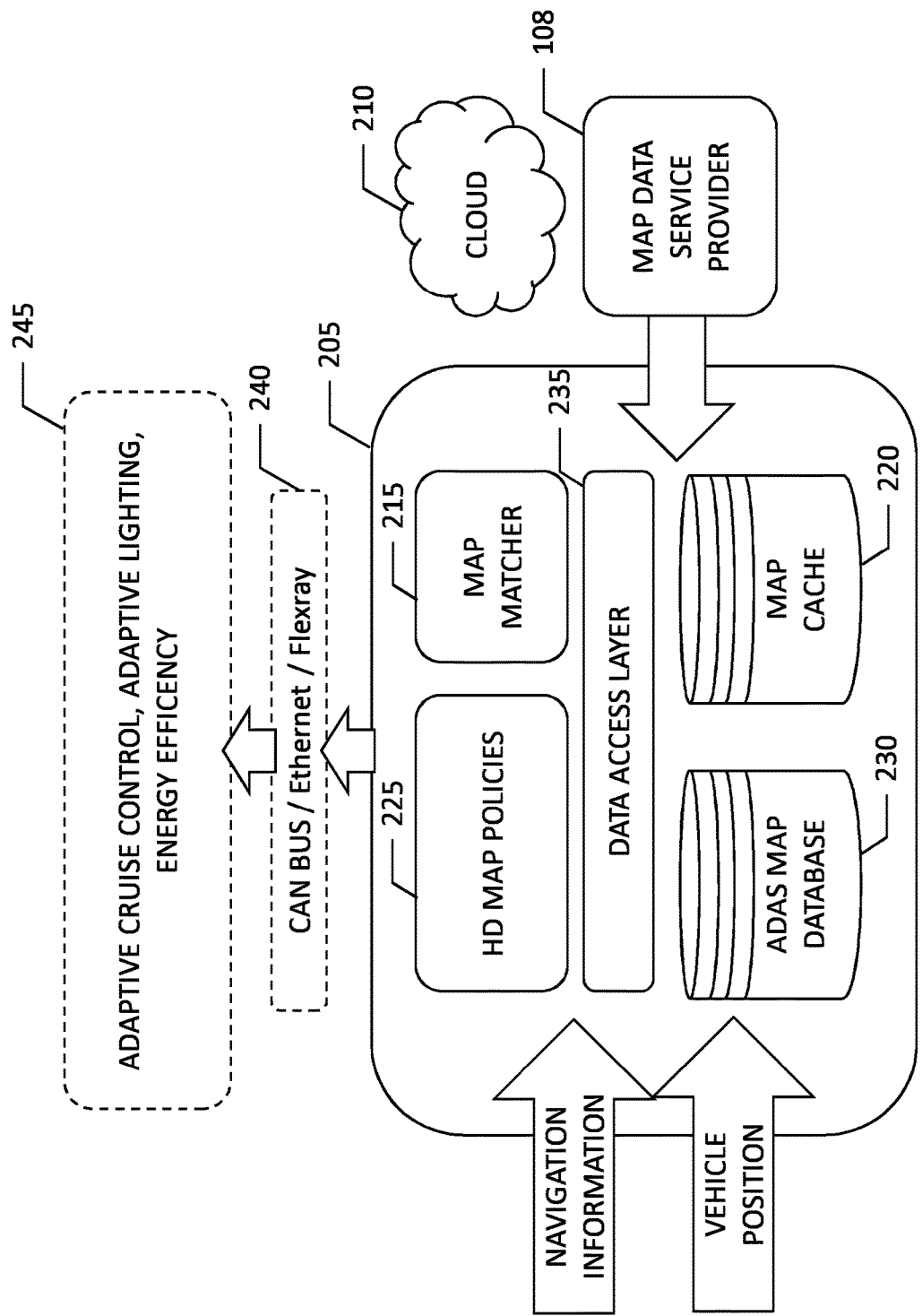
Figure 6:
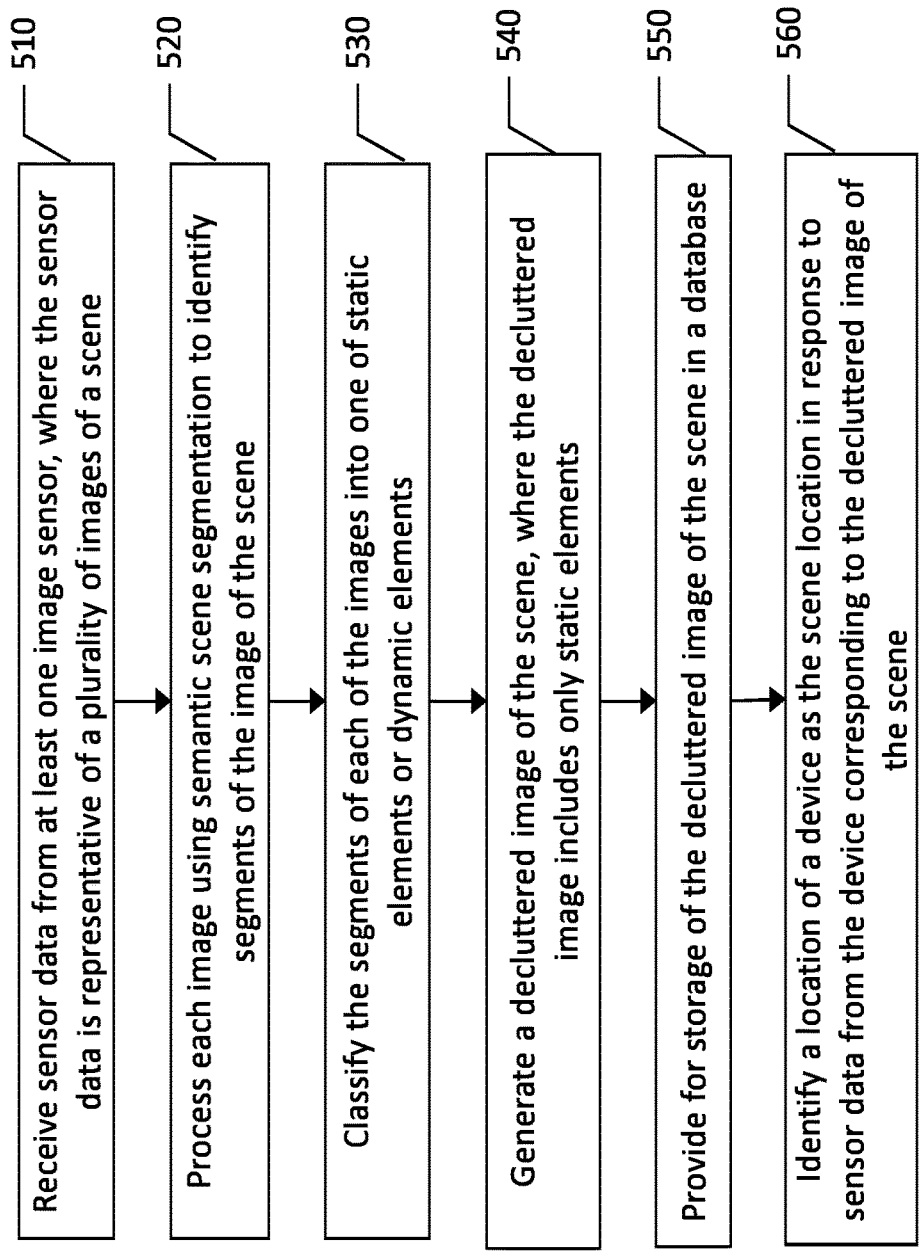

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for creating a visual map of an environment free of scene clutter according to an example embodiment of the present disclosure;

FIG. 3 illustrates an image of a scene including dynamic elements and static elements according to an example embodiment of the present disclosure;

FIG. 4 illustrates the image of the scene of FIG. 3 with the dynamic elements removed according to an example embodiment of the present disclosure;

FIG. 5 is a block diagram of a system for implementing the methods described herein for creating a visual map of an environment free of scene clutter and providing for autonomous control of a vehicle responsive thereto according to an example embodiment of the present disclosure; and FIG. 6 is a flowchart of operations for generating learning data to facilitate creating a visual map of an environment free of scene clutter according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for creating a visual map of an environment free of scene clutter, and more particularly, to a process of creating a visual map of an environment whereby dynamic elements are removed and static elements remain for an undistorted geometry of the scene. Embodiments described herein relate to vision-based mapping, where a map is represented as a collection of geo-referenced images that are amenable to visual place-recognition. When an environment lacks satellite-based locationing availability, such as the Global Positioning Satellite system, or when satellite-based locationing has low accuracy, a localization technique may be used to position the object relative to a map using only on-board sensor readings. Embodiments described herein may be of particular benefit to vehicle locationing, where identifying the location of a vehicle may be important. Vehicle navigation or autonomous or semi-autonomous vehicle control may rely on accurate identification of a location of a vehicle. As such, it may be important to determine the location of such a vehicle even when satellite based navigation techniques are not available or reliable. Vision-based mapping matches sensor data from the vehicle to an existing map in the form of geo-referenced images, which allows the vehicle to estimate its position relative to the map.

A challenge of vision-based mapping is that images of environments, whether they are images captured by a vehicle to determine its location, or whether it is an image used to build a vision-based map of geo-referenced images, is the presence of dynamic objects. Dynamic objects are objects that are not always present in the environment. They may be periodically present, present at random times, or present only once. Dynamic objects may include objects such as cars traveling along a road segment, a fallen tree occupying a portion of a road segment, an abandoned vehicle along the side of a road segment, construction equipment/barricades, or the like. These dynamic objects may be present when a first image of an environment is captured, but not present when another image of the environment is captured. Dynamic objects, if they remain in the geo-referenced images of a vision-based map, may reduce the reliability of vision-based mapping as a vehicle may not be able to appropriately correlate an image lacking a certain dynamic object with an image that includes that certain dynamic object.

FIG. 1 is a schematic diagram of an example apparatus configured for performing some of the operations described herein, particularly the gathering and processing of images that are geo-referenced for inclusion in a vision-based map database, or capturing of images to compare against a map database of geo-referenced images to identify the location of a vehicle. Apparatus 20 is an example embodiment that may be embodied by or associated with any of a variety of computing devices that include or are otherwise associated with a device configured for providing advanced driver assistance features. For example, the computing device may be an Advanced Driver Assistance System module (ADAS) which may at least partially control autonomous or semi-autonomous features of a vehicle with the assistance of establishing the vehicle location using a vision-based mapping system according to example embodiments described herein; however embodiments of the apparatus may be embodied or partially embodied as a mobile terminal, such as a personal digital assistant (PDA), mobile telephone, smart phone, personal navigation device, tablet computer, camera or any combination of the aforementioned systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, image sensor, LiDAR (Light Distancing and Ranging) sensor, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over cellular or other wireless communication systems including Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication or may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, which may be a map of a vision-based mapping system, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment of an apparatus for use in a vision-based mapping system, the map stored in memory 26 may include a database of geo-referenced images used to identify the location of a vehicle through vision-based mapping techniques. In an example in which the apparatus is embodied by a vehicle, the memory 26 may store a portion of a vision-based map database including only portions of the database that are within a predetermined geographic region relative to the vehicle such that latency may be minimized when establishing a location through analysis of the geo-referenced images.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Having an accurate understanding of a location is critical to navigation assistance and autonomous or semi-autonomous vehicle control.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. Autonomous and semi-autonomous vehicle control may be performed in a variety of different ways. However, an understanding of the location of the vehicle is critical when using any form of map-based vehicle control. While some degree of autonomy can be provided through visual identification of objects along a road by a vehicle traveling along the road, such vision-based autonomous control strategies may benefit from or rely upon proper location identification of the vehicle among the road network. For example, accurately identifying the location of a vehicle along a road segment may enable identification of roadway restrictions, such as a speed limit, but also provide an understanding of the road geometry which may be stored in the map database, such as in a High Definition (HD) map database. In such embodiments, sensors on the vehicle may be used to establish dynamic obstacles and other vehicles on the road segment, while an understanding of the environment may rely upon accurate identification of the vehicle on a road segment.

Autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle. Embodiments described herein may facilitate the building and updating of HD maps through the creation and updating of a map environment free of scene clutter. Embodiments may create a visual map of an environment where dynamic elements are removed and static elements remain for an undistorted geometry of the environment.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data, geo-referenced image data for vision-based locating, or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example. Such an embodiment may benefit vehicles using or relying on vision-based locating by storing or caching a portion of the database of geo-tagged images used for vision-based mapping on memory local to the vehicle in order to reduce or eliminate latency, which may be important during autonomous vehicle control that relies upon accurate location identification during operation.

As described above, the map database 110 of example embodiments may be generated from a plurality of different sources of data. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Embodiments described herein may broadly relate to computer vision when there is a need to declutter an image of an environment to remove dynamic objects from the environment for a clearer and uniform image of the environment including only the elements unlikely to change over time. Embodiments may be beneficial for generation and confirmation of HD maps facilitating autonomous or semi-autonomous vehicle control. Embodiments may be used for establishing a location of a vehicle or confirming the location of a vehicle through identification of a location based on images of the surroundings of a vehicle.

Embodiments of the present disclosure relate to creating a visual-map of environments, a process that enables the map to be free of scene clutter. Provided herein is a technique in which a mapping vehicle can traverse an environment at any given time of day, without constraints on the traffic patterns or occlusion conditions, and still collect sufficient datasets that enable clutter-free map creation. The creation process may involve a semantics-based scene decluttering network that generates a clutter-free representation of the scene.

Decluttering of a scene includes the removal of dynamic objects in the environment, such as the elimination of moving objects such as driven vehicles or pedestrians and generally movable objects such as parked cars. In order to declutter a scene through removal of dynamic obstacles in the environment, raw sensor data from an image sensor or LiDAR sensor may be fed to a neural network of a segmentation module that may perform semantic scene segmentation. The segmentation module may be embodied by the processor 24 of FIG. 1, particularly if employed in a mobile device, or optionally embodied by a processing device remotely located from a vehicle capturing the sensor data, such as by map data service provider 108 communicating with mobile device 104 via network 112, where mobile device 104 may be embodied by apparatus 20 and may be capturing images of an environment. The segmentation module may include a SegNet framework, which may be a deep convolutional encoder-decoder architecture. This segmentation framework segments objects within the image that can then be classified into static objects (e.g., static parts of the environment) and dynamic objects (e.g., object not constant in the environment).

A segmentation mask may be overlaid on all the movable/dynamic elements/objects in the scene. Subsequently, the segmentation mask may be used as an input into a Generative Adversarial Network to hallucinate the scene contents and is constrained by the geometry of the static elements in the scene. Hallucinating the scene contents is to generate an image of higher resolution than the input images, where a hallucination is a perception of the image having a complex, potentially life-like appearance. A continuity is constrained between the hallucinated geometry and underlying scene to ensure that the pixels corresponding to movable/dynamic elements become representative of static elements. The resulting image includes only static elements and is representative of true scene geometry. This set of images or sensor readings (e.g., LiDAR), with corresponding georeferenced points, may be used as a visual map of the region.

A visual map generated through embodiments described herein may provide a comprehensive database of the environment along each road segment of a network of roadways. The visual map may be part of or work in concert with HD maps as described above to facilitate navigational assistance, autonomous or semi-autonomous driving, and accurate location identification. Location identification may be implemented by correlating sensor readings of an image sensor or LiDAR sensor, for example, of a vehicle traveling along a road segment with the visual map generated as described herein. This method of location determination may facilitate navigation and various degrees of autonomous vehicle control.

The Generative Adversarial Network used to hallucinate the scene contents may be trained using training data captured by sensors as they traverse a road segment. This data may be captured by a vehicle deployed specifically for the purpose of collecting road segment data, or alternatively, may be captured by sensor-laden vehicles traveling along the road segments of a road network. Vehicles configured for autonomous driving or having some degree of autonomy are equipped with sensor packages that can provide anonymous road segment data to facilitate data gathering and to train a Generative Adversarial Network as described herein.

The training data may include two or more images of the same scene, where at least one image includes clutter or dynamic objects, while at least one other image includes little or no clutter or dynamic objects. Synthetic sensor data may be used in some embodiments to aid in the generation of training data. Using distinctions between the cluttered environment scene and the uncluttered environment scene, the Generative Adversarial Network is trained to identify dynamic objects within an environment. Upon detection of dynamic objects, those objects may be removed and based on the constraints of the static, fixed elements of a scene, the scene may be interpolated or hallucinated through the locations of the removed dynamic objects.

FIG. 3 illustrates an example embodiment of sensor data captured of a scene of an environment. The Segmentation framework may segment the image into objects, including the illustrated curb/sidewalks 310, 320, a building 330, and parked vehicles 340, 350. The Generative Adversarial Network, trained using training data as described above, may classify the identified objects. In the illustrated embodiment, objects 340, 350 are classified as dynamic objects, while objects 310, 320, 330, are classified as static objects. FIG. 4 illustrates the scene of FIG. 3 after semantic decluttering, where the objects classified as dynamic have been removed to leave only the static elements of the environment 300. According to some embodiments, semantic decluttering may not remove all clutter from an environment, but may remove a substantial portion of the clutter, such that semantic decluttering will reduce, but may not eliminate the clutter of an environment.

As described above, HD maps and the visual maps generated as described herein may be instrumental in facilitating autonomous vehicle control. Building the HD maps and visual maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps and visual maps, and to facilitate autonomous control of the vehicle generating the sensed data.

According to example embodiments described herein, the role of HD maps and visual maps in facilitating autonomous or semi-autonomous vehicle control may include crowd-sourced building of the maps to identify and confirm static objects and dynamic objects along with their respective locations. In the context of map-making, the features from the environment may be detected by a perception system of a map services provider or a vehicle traveling along a road segment and consolidated to form a representation of the actual real-world environment in the form of a map.

FIG. 5 illustrates an example embodiment of architecture specifically configured for implementing embodiments described herein. The illustrated embodiment of FIG. 5 may be vehicle-based, where sensor data is obtained from sensors of a vehicle traveling along a road segment. The location of the collected sensor data along the road segment may be determined through location determination using GPS or other locationing means, or using visual map correlation through correlation with map data of map data service provider 108. As illustrated, the architecture includes a map data service provider 108 that provides map data (e.g., visual maps and HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). Further, signs along the road segment may be used to understand rules of operation along the road segment, and to identify changes to traffic flows which may be communicated via signs. The information from signs and their location along road segments may inform policies that govern how a vehicle is to traverse a road segment and these policies may be stored, for example, in an HD map of the region. The HD map policies associated with the road segment may be provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors used to capture data relating to the surrounding environment. A vehicle with autonomous or semi-autonomous control may detect features in the environment of the vehicle using a perception system trained according to embodiments described herein to facilitate the autonomous or semi-autonomous control. Sensor redundancy may be used to provide additional confirmation relating to features and objects of the environment and to improve detection and reliability of vehicle interpretation of the surrounding environment. In order to implement full autonomy for a vehicle, the vehicle is contextually aware in that the vehicle is aware of the surroundings in terms of both dynamic conditions (e.g., weather, traffic, construction) and static conditions (e.g., road geometry, road signs). The vehicle context may be interpreted based on sensor observations that are passed through a perception module to understand the content of the observed environment. The perception module's set of detectors may correspond to deep-neural network based methods of understanding features in the environment and identifying a location of the features in the environment. Embodiments described herein include a method to improve the performance of detecting features and objects in an environment and properly locating them in the environment beyond conventional methods relying on human, manual labeling of objects in all image datasets as many of these images may not provide the informative value to the neural network provided by those that satisfy the neural network thresholds described above.

FIG. 6 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 is a flowchart of a method for creating a visual map of an environment free of scene clutter, and more particularly, to a process of creating a visual map of an environment whereby dynamic elements are removed and static elements remain for an undistorted geometry of the scene. As shown, at 510, sensor data is received from at least one image sensor, where the sensor data is representative of a plurality of images of a scene. At 520, each image is processed using semantic scene segmentation to identify segments of the image of the scene. At 530, the segments of each of the images are classified as either static elements or dynamic elements. At 540, a decluttered image of the scene is generated that includes only static elements of the scene. Storage of the decluttered image is provided at 550 in a database, such as a map services provider map database 108. A location of a device is identified at 560 in response to sensor data from the device corresponding to the decluttered image of the scene.

In an example embodiment, an apparatus for performing the method of FIG. 6 above may comprise a processor (e.g., the processor 24) configured to perform some or each of the operations (510-560) described above. The processor may, for example, be configured to perform the operations (510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
receive sensor data from at least one image sensor, wherein the sensor data is representative of a plurality of images, each image representative of a scene at a scene location;
process each image using semantic scene segmentation to identify segments of the image of the scene;
classify the segments of each of the images of the scene into one of static elements or dynamic elements to generate segmented images;
generate at least one decluttered image of the scene, wherein the decluttered image comprises only elements classified as static elements, wherein causing the apparatus to generate at least one decluttered image of the scene comprises causing the apparatus to:
process the segmented images using a general adversarial network to hallucinate image contents associated with dynamic elements of the scene; and
constrain a continuity between the hallucinated image contents and static elements in the scene such that pixels corresponding to dynamic elements become representative of static elements;
provide for storage of the decluttered image of the scene in a database; and
identify a location of a device as the scene location in response to sensor data from the device corresponding to the decluttered image of the scene.

2. The apparatus of claim 1, wherein causing the apparatus to process each image using semantic scene segmentation to identify segments of the image of the scene comprises causing the apparatus to process each image using a neural network that performs semantic scene segmentation to identify segments of the image of the scene.

3. The apparatus of claim 1, wherein causing the apparatus to
process the segmented images using a general adversarial network to hallucinate image contents of the scene comprises causing the apparatus to:
overlay at least one segmentation mask on the dynamic elements in the segmented images;
provide the at least one segmentation mask as input to the general adversarial network to hallucinate the image contents; and
constrain a geometry of the decluttered image of the scene based on the static elements of the scene.

4. The apparatus of claim 1, where causing the apparatus to identify a location of a device as the scene location comprises causing the apparatus to:
receive sensor data from the device representative of a scene;
correlate the received sensor data with the stored decluttered image of the scene; and
identify a location of the device as the scene location.

5. The apparatus of claim 4, wherein the device comprises an autonomous vehicle, and wherein, in response to identifying the location of the device as the scene location, causing the apparatus to provide for autonomous control of the autonomous vehicle based on the identified location of the autonomous vehicle.

6. The apparatus of claim 4, wherein the device comprises a vehicle, and wherein, in response to identifying the location of the device as the scene location, causing the apparatus to provide for navigational assistance to the vehicle based on the identified location of the vehicle.

7. The apparatus of claim 1, wherein causing the apparatus to classify the segments of each of the images of the scene into one of static elements or dynamic elements comprises causing the apparatus to analyze distinctions between images of the scene and classifying elements that change between images as dynamic elements.

8. A computer program product comprising at least one non-transitory computer-readable storage medium having computer-executable program code instructions stored therein, the computer-executable program code instructions comprising program code instructions to:
receive sensor data from at least one image sensor, wherein the sensor data is representative of a plurality of images, each image representative of a scene at a scene location;
process each image using semantic scene segmentation to identify segments of the image of the scene;
classify the segments of each of the images of the scene into one of static elements or dynamic elements to generate segmented images;
generate at least one decluttered image of the scene, wherein the decluttered image comprises only elements classified as static elements, wherein the program code instructions to generate a decluttered image of the scene comprise program code instructions to:
process the segmented images using a general adversarial network to hallucinate image contents associated with dynamic elements of the scene; and
constrain a continuity between the hallucinated image contents and static elements in the scene such that pixels corresponding to dynamic elements become representative of static elements;
provide for storage of the decluttered image of the scene in a database; and
identify a location of a device as the scene location in response to sensor data from the device corresponding to the decluttered image of the scene.

9. The computer program product of claim 8, wherein the program code instructions to process each image using semantic scene segmentation to identify segments of the image of the scene comprise program code instructions to process each image using a neural network that performs semantic scene segmentation to identify segments of the image of the scene.

10. The computer program product of claim 8, wherein the program code instructions to
- process the segmented images using a general adversarial network to hallucinate image contents of the scene comprise program code instructions to:
- overlay at least one segmentation mask on the dynamic elements in the segmented images;
- provide the at least one segmentation mask as input to the general adversarial network to hallucinate the image contents; and
- constrain a geometry of the decluttered image of the scene based on the static elements of the scene.

11. The computer program product of claim 8, where the program code instructions to identify a location of a device as the scene location comprise the program code instructions to:
- receive sensor data from the device representative of a scene;
- correlate the received sensor data with the stored decluttered image of the scene; and
- identify a location of the device as the scene location.

12. The computer program product of claim 11, wherein the device comprises an autonomous vehicle, and wherein, in response to identifying the location of the device as the scene location, providing for autonomous control of the autonomous vehicle based on the identified location of the autonomous vehicle.

13. The computer program product of claim 11, wherein the device comprises a vehicle, and wherein, in response to identifying the location of the device as the scene location, providing for navigational assistance to the vehicle based on the identified location of the vehicle.

14. The computer program product of claim 8, wherein the program code instructions to classify the segments of each of the images of the scene into one of static elements or dynamic elements comprise program code instructions to analyze distinctions between images of the scene and classify elements that change between images as dynamic elements.

15. A method comprising:
- receiving sensor data from at least one image sensor, wherein the sensor data is representative of a plurality of images, each image representative of a scene at a scene location;
- processing each image using semantic scene segmentation to identify segments of the image of the scene;
- classifying the segments of each of the images of the scene into one of static elements or dynamic elements to generate segmented images;
- generating at least one decluttered image of the scene, wherein the decluttered image comprises only elements classified as static elements, wherein generating a decluttered image of the scene comprises:
  - processing the segmented images using a general adversarial network to hallucinate image contents associated with dynamic elements of the scene; and
  - constraining a continuity between the hallucinated image contents and static elements in the scene such that pixels corresponding to dynamic elements become representative of static elements;
- providing for storage of the decluttered image of the scene in a database; and
- identifying a location of a device as the scene location in response to sensor data from the device corresponding to the decluttered image of the scene.

16. The method of claim 15, wherein processing each image using semantic scene segmentation to identify segments of the image of the scene comprises processing each image using a neural network that performs semantic scene segmentation to identify segments of the image of the scene.

17. The method of claim 15, wherein
processing segmented images using a general adversarial network to hallucinate image contents of the scene comprises:
- overlaying at least one segmentation mask on the dynamic elements in the segmented images;
- providing the at least one segmentation mask as input to the general adversarial network to hallucinate the image contents; and
- constraining a geometry of the decluttered image of the scene based on the static elements of the scene.

18. The method of claim 15, wherein identifying a location of a device as the scene location comprises:
- receiving sensor data from the device representative of a scene;
- correlating the received sensor data with the stored decluttered image of the scene; and
- identifying a location of the device as the scene location.

19. The method of claim 18, wherein the device comprises an autonomous vehicle, and wherein, in response to identifying the location of the device as the scene location, providing for autonomous control of the autonomous vehicle based on the identified location of the autonomous vehicle.

20. The method of claim 18, wherein the device comprises a vehicle, and wherein, in response to identifying the location of the device as the scene location, providing for navigational assistance to the vehicle based on the identified location of the vehicle.

* * * * *